(12) United States Patent
Tomaiuolo (10) Patent No.: US 6,574,833 B1
(45) Date of Patent: Jun. 10, 2003

(54) ASSIST DEVICE FOR ENTERING AND EXITING A VEHICLE

(76) Inventor: Theodore J. Tomaiuolo, 114 Bohemia St., Plainville, CT (US) 06062

( * ) Notice: Subject to any disclaimer, the term of this patent is extended or adjusted under 35 U.S.C. 154(b) by 0 days.

(21) Appl. No.: 10/022,054

(22) Filed: Dec. 17, 2001

Related U.S. Application Data (60) Provisional application No. 60/292,490, filed on May 21, 2001.

(51) Int. Cl.[7] ............................. B60B 7/00; A45C 13/26
(52) U.S. Cl. ......................... 16/110.1; 16/436; 16/422; 16/426; 16/429
(58) Field of Search ............................... 16/110.1, 436, 16/422, 426, 429; 280/33.992, 727; 296/1.1, 152, 63, 64, 65.02, 65.13

(56) References Cited

U.S. PATENT DOCUMENTS

| | | | |
|---|---|---|---|
| 4,248,441 A | * | 2/1981 | Joseph .................. 280/33.992 |
| 4,626,016 A | * | 12/1986 | Bergsten ..................... 296/1.1 |
| 5,913,562 A | * | 6/1999 | Mattarella et al. .......... 296/152 |
| 6,340,189 B1 | * | 1/2002 | Pordy .......................... 296/1.1 |

FOREIGN PATENT DOCUMENTS

WO     WO 01/19642 A2 * 3/2001

* cited by examiner

*Primary Examiner*—Chuck Y. Mah
(74) *Attorney, Agent, or Firm*—Alix, Yale & Ristas, LLP (57) ABSTRACT

An assist device provides a stable support for entering and exiting a vehicle through a door frame having a striker mounted on a side portion of the door frame which is engageable with a latch of a door for securing the door in a closed position. The assist device includes a retainer adapted which removably engages the striker. A support member mounted to the retainer supports at least a portion of a user's weight.

27 Claims, 7 Drawing Sheets

ASSIST DEVICE FOR ENTERING AND EXITING A VEHICLE

CROSS-REFERENCE TO RELATED APPLICATIONS

This application claims the benefit under 35 U.S.C. §119 (e) of U.S. Provisional Patent Application Ser. No. 60/292,490 filed May 21, 2001.

BACKGROUND OF THE INVENTION

This invention relates generally to mechanical aids and methods that enhance the self-mobility of a person, especially physically challenged individuals. More particularly, the present invention relates to devices and methods which may be employed for assisting elderly and/or disabled individuals in or out of a vehicle.

A number of prior art devices are found which attempt to provide a means for lifting or hoisting a patient or other incapacitated person from a sitting or prone position. Such devices are intended for use with a standard bed or chair and require access to the area in front of or beside the bed or chair. Many of these prior art devices require the explicit assistance of at least one other care giver to operate the prior art device and to assist the individual in keeping his or her balance. Some of the prior art devices use motorized or electrically powered features which are often expensive, prone to repair, and do not allow the user to effectively exercise any portion of their physical body which may not be subject to their particular handicap or disability.

Furthermore, many of these prior art devices are bulky, heavy, and provide assistance in movement between only two fixed reference points. Such devices are particulary unsuited for use in assisting movement in or out of automobiles. First, access to seats in an automobile is generally limited to a single side. Second, there is no industry standard with respect to the position of the seats in an automobile. Consequently, there is a great degree of variation among the many brands and models of automobiles in the height of the seating surface with respect to the ground surface on which the tires rest and in the distance between the outside edge of the seat and the outside surface of the car. In addition, the topography of the land adjacent to the parked automobile will vary from parking spot to parking spot. Therefore, a device which will provide assistance between two fixed reference points will not be useable for all makes and models of automobiles and will often be unuseable even if it is designed for use with a specific model of automobile.

SUMMARY OF THE INVENTION

Briefly stated, the invention in a preferred form is an assist device which provides a stable support for entering and exiting a vehicle through a door frame having a striker mounted on a side portion of the door frame which is engageable with a latch of a door for securing the door in a closed position. The assist device includes a retainer adapted which removably engages the striker. A support member mounted to the retainer has a support platform segment which supports at least a portion of a user's weight.

In a first embodiment, the support member includes a support platform segment, an extension segment, and an engagement segment. The extension segment extends laterally downward from one end of the support platform segment to the engagement segment. The retainer may be inserted through an opening formed between the side portion of the door frame and a U-shaped striker member. The retainer includes first and second legs, with the first leg being mounted to the support platform segment intermediate the ends and substantially on the centerline. The retainer extends longitudinally along said centerline of the support member.

In a second embodiment, the support member includes a support platform segment and an extension segment extending laterally downward from the one end of the support platform segment. The retainer includes first and second legs extending from a curved bend portion, which is mounted to the distal end of the extension segment of the support member. The retainer receives and engages a stud striker member in the bend portion. The retainer also including a bumper which is mounted to the end portion of the second leg.

In a third embodiment, the support member includes a support platform segment and first and second leg segments extending orthogonally downward from the ends of the support platform segment. The retainer includes first and second legs extending from a curved bend portion, which is mounted along the centerline of the support member substantially midway between the ends of the support platform segment. The retainer receives and engages a cross-bar of a U-shaped striker member in the bend portion. Each of the legs comprises a main portion extending from the bend portion of the retainer to a distal end portion. The distal end portion of each leg extends obliquely outward from the main portion of the leg.

Accordingly, it is an object of the invention to provide a completely self-assisted device for individuals requiring assistance in exiting or entering a vehicle.

Another object of the invention is to provide a device that allows a physically challenged individual to maintain their balance throughout the process of moving in or out of a vehicle thereby decreasing the possibility of falling and increasing psychological confidence in the process.

A further object of the invention is to provide a lightweight, durable, portable, mobile device easily capable of being physically moved by a handicapped or disabled.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
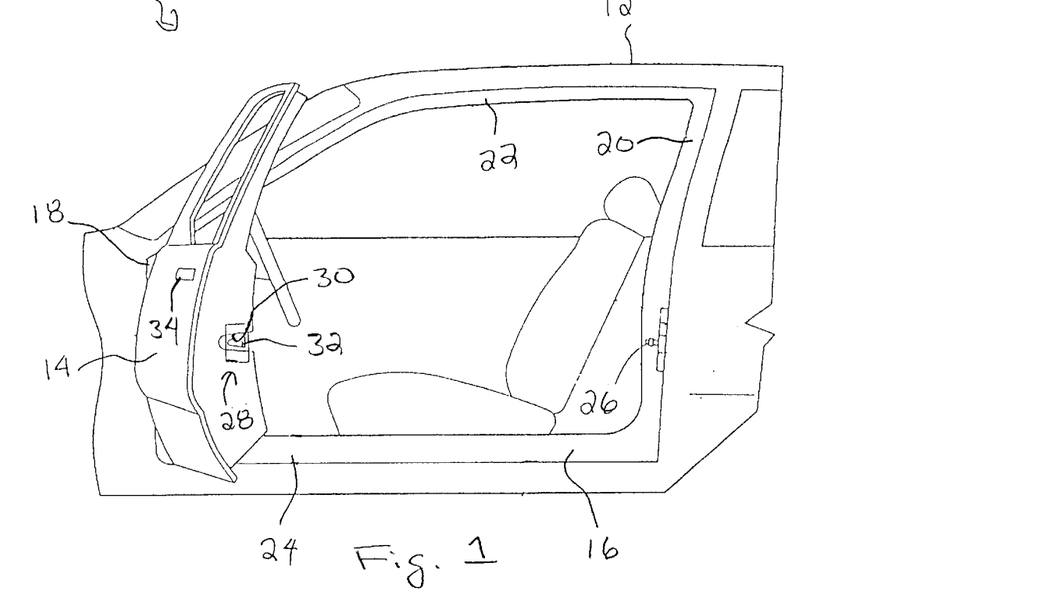
FIG. 1 is a partial side elevational view of a typical automobile.

Referring to FIG. 1, a typical automobile 10 generally includes a vehicle body 12 formed from a plurality of panels and members which generally define the overall structural shape and appearance of the automobile. The automobile body 12 generally includes at least one closure panel portion, such as a door 14.

The door 14 is typically mounted within a door frame 16 defined by opposed, horizontally spaced, vertically extending first and second sides 18, 20 and opposed, vertically spaced, horizontally extending top and bottom sides 22, 24. The door 14 is pivotally mounted to the first side 18 by a hinge (or hinges), or the like, and in a closed position, is retained to the second side 20 such that in a closed position the door 14 and automobile body 12 form a relatively generally planar surface.

Figure 2:
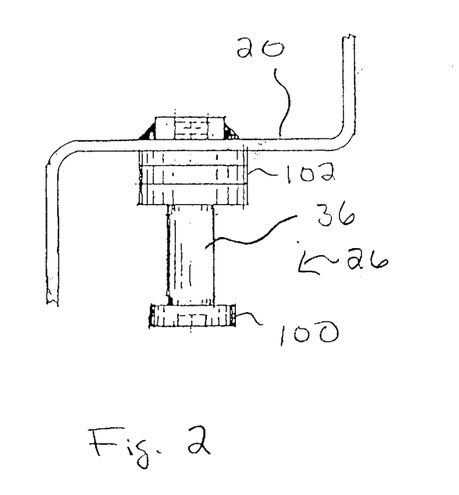
FIG. 2 is a cross-sectional view through the side of the doorframe of FIG. 1, illustrating a striker stud.
Figure 3:
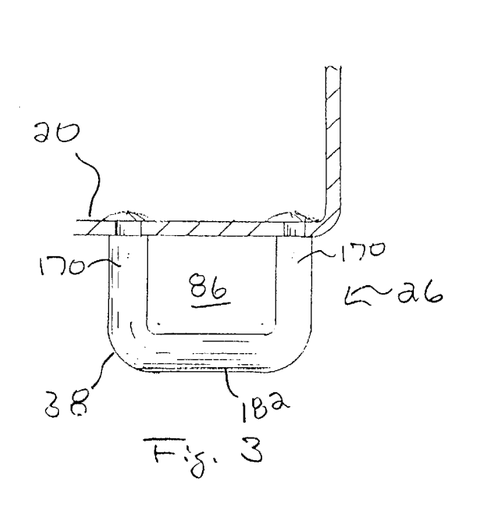
FIG. 3 is a cross-sectional view through the side of the doorframe of FIG. 1, illustrating a U-shaped striker member.

The automobile body 12 typically includes a striker 26 mounted to the second side 20. The door 14 typically includes a latch 28 having a striker retaining portion 30 and an engaging mechanism 32 within the striker retaining portion 30. The engaging mechanism 32 is operably connected to a door handle 34 positioned on the door 14. To close the door 14, the door 14 is directed in a closing direction, until the striker 26 is fixedly engaged within the striker retaining portion 30 by the engaging mechanism 32. To open the door 14, the door handle 34 is moved to disengage the engaging mechanism 32 from the striker 26 so that the door 14 can pivot in an open direction. With reference to FIGS. 2 and 3, the striker 26 may comprise a stud 36 or a U-shaped member 38.

Figure 4:
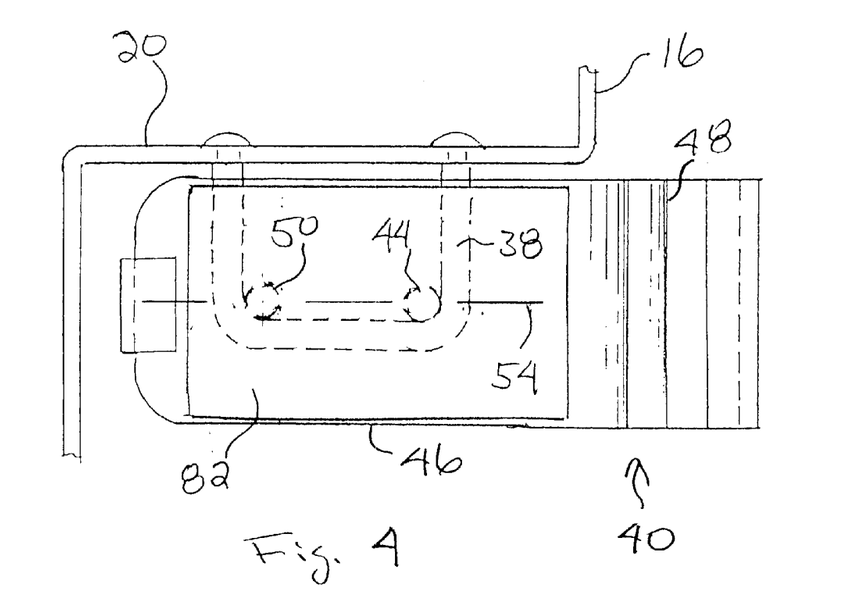
FIG. 4 is a top view, partly in phantom, of a first embodiment of an assist device in accordance with the invention mounted on a U-shaped striker member.
Figure 6A:
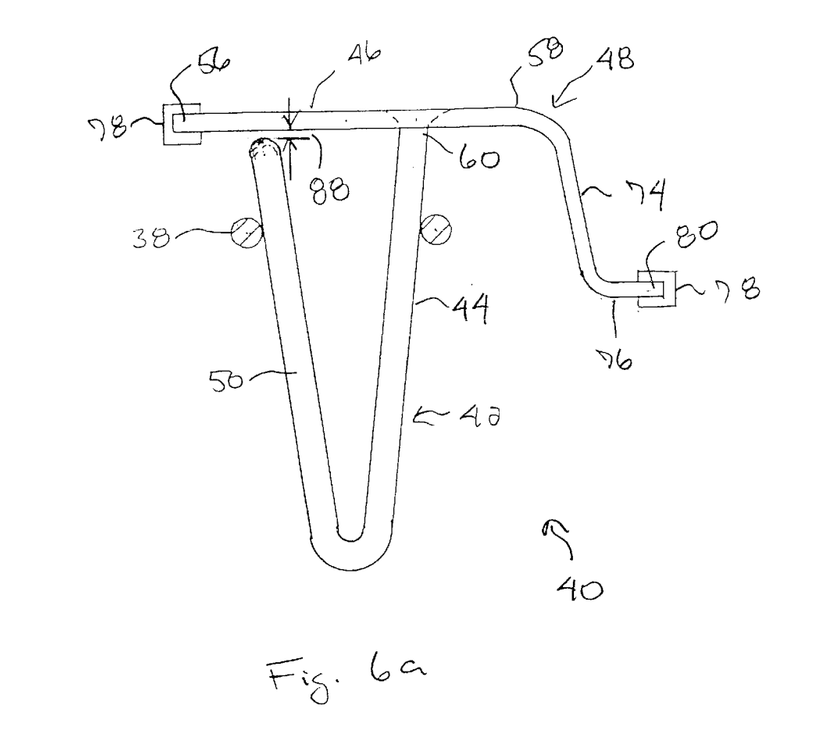
FIGS. 6a and 6b are front views of the assist device and U-shaped striker member of FIG. 4, illustrating the assist device when it is not supporting a user's weight and when it is supporting a user's weight, respectively.
Figure 6B:
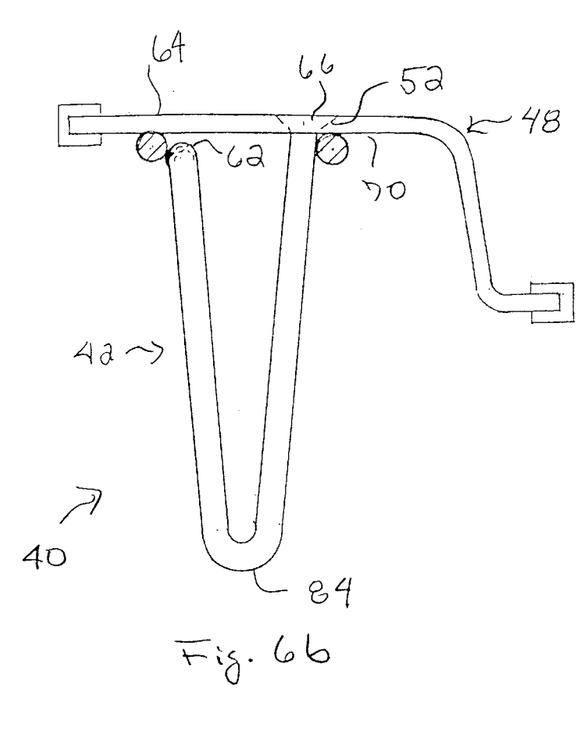
Figure 12:
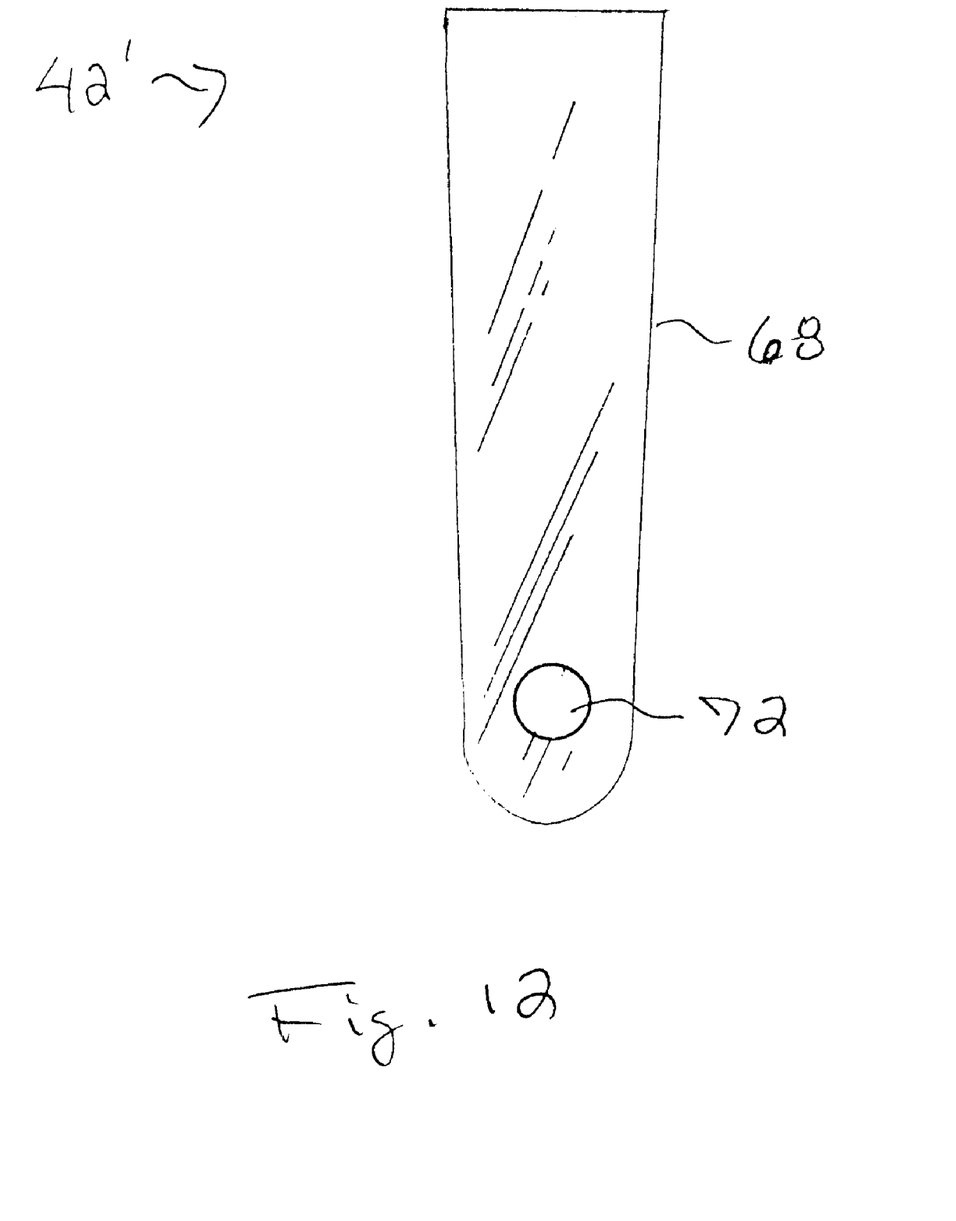
FIG. 12 is a front view of a variant of the retainer of FIG. 5.

With reference to FIGS. 4, 6a and 6b, a first embodiment of the assist device 40 is employed in conjunction with a vehicle 10 having U-shaped striker members 38. The assist device 40 includes a V-shaped retainer 42 which preferably has a round cross-section. A first leg 44 of the retainer 42 is mounted to a longitudinally extending support platform segment 46 of a support member 48 and the second leg 50 is left free to move. In a preferred embodiment, an opening 52 extends through the support platform segment 46 of the support member 48 on the centerline 54 at a position intermediate the first and second ends 56, 58 of segment 46. The end portion 60 of the first leg 44 is positioned in or proximate to the lower portion of the opening 52 and the retainer 42 is oriented along the centerline 54 of the support member 48 such that the end 62 of the second leg 50 is positioned intermediate opening 52 and the first end 56 of segment 46. The end portion 60 of the first leg 44 is mounted from above the top surface 64 of the support platform segment 46 by a plug weld 66. Alternatively, the retainer 42 may comprise an elongated plate 68 (FIG. 12) which is welded to the lower surface 70 of the support platform segment 46. Protruding bumpers 72 are cemented or otherwise fixed in place project from distal portions of the plate 68 to engage the door frame 16 and provide stability for the support member 48.

An extension segment 74 of the support member 48 extends laterally downward from the second end 58 of the support platform segment 46 to an engagement segment 76. Bumpers 78 composed of rubber or similar material are mounted to the first end 56 of the support platform segment 46 and the free end 80 of the engagement segment 76. Preferably, a non-skid coating or material 82 is affixed to at least a portion of the upper surface 64 of the support platform segment 46.

The assist device 40 is mounted in place by inserting the trough 84 of the retainer 42 through the opening 86 formed by the U-shaped striker member 38 and the door frame 16 of the vehicle 10, as shown in FIG. 6a. The retainer 42 is configured to wedge against the interior surface of the striker member 38 to stabilize the support member 48 so that an elderly person or a disabled person may use the support platform segment 46 to assist in entering or exiting the automobile 10. As the user pushes on the upper surface 64 of the support platform segment 46 to obtain support, the retainer 42 acts like a spring with the second leg 50 flexing toward the first leg 44 until the bottom surface 70 of segment 46 rests on striker member 38. The spring tension of the compressed retainer 42 holds the device 40 in position. The first end 56 of the support platform segment 46, and the bumper 78 mounted thereon, may contact the door frame 16 (depending on the vehicle) to provide additional support and stability.

In a preferred embodiment, the end 62 of the second leg 50 is rounded to prevent binding in the event of contact between end 62 and surface 70. Further, there is a gap 88 (preferably 0.045 inches) between end 62 and surface 70 to reduce the possibility of such contact. When the user no longer requires assistance, his or her weight is removed from the device 40 and the spring tension biases the legs 44, 50 apart, forcing the retainer 42, and support member 48 mounted thereon, upward. The retainer 42 may then be easily be withdrawn from opening 86 to remove the assist device 40 so that the vehicle door 14 may be closed.

Figure 5:
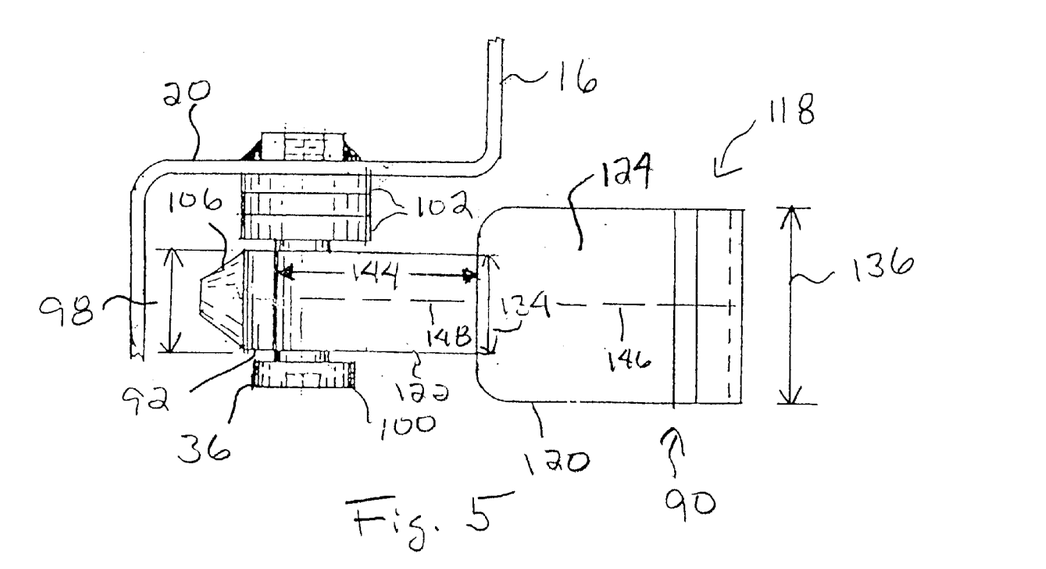
FIG. 5 is a top view of a second embodiment of an assist device in accordance with the invention mounted on a striker stud.
Figure 7A:
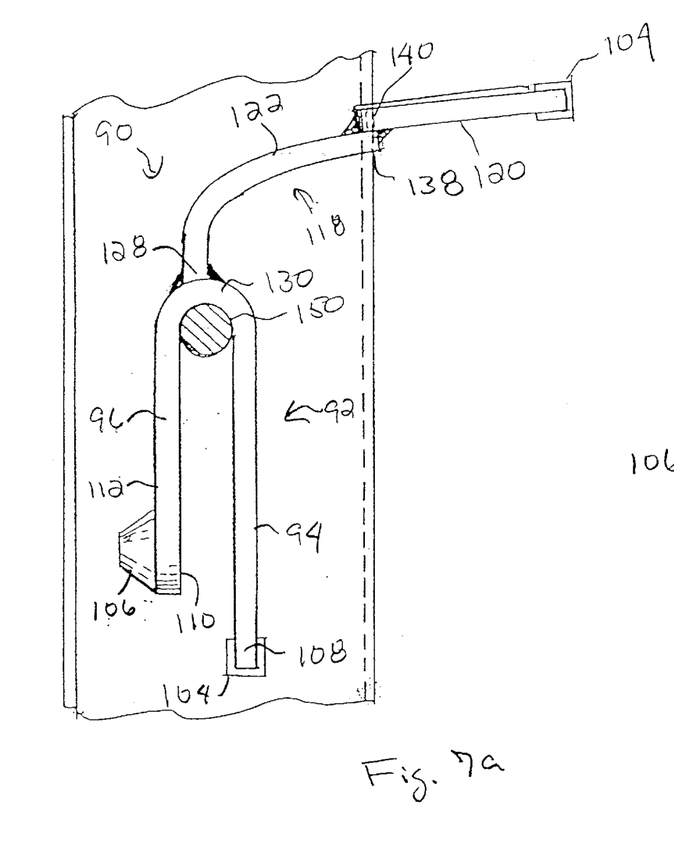
FIGS. 7a and 7b are front views of the assist device and striker stud of FIG. 5, illustrating the assist device when it is not supporting a user's weight and when it is supporting a user's weight, respectively.
Figure 7B:
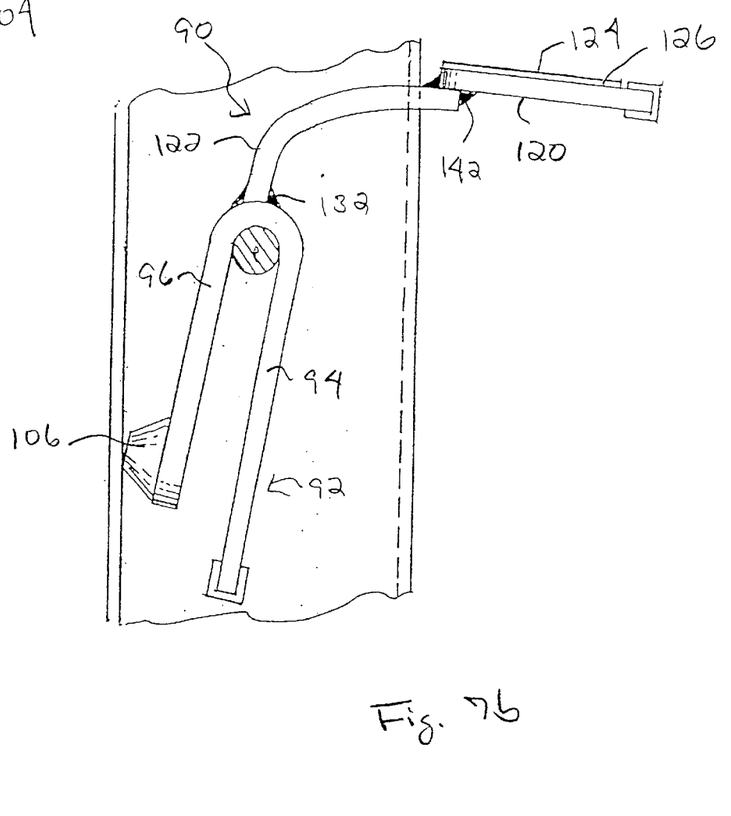
Figure 8:
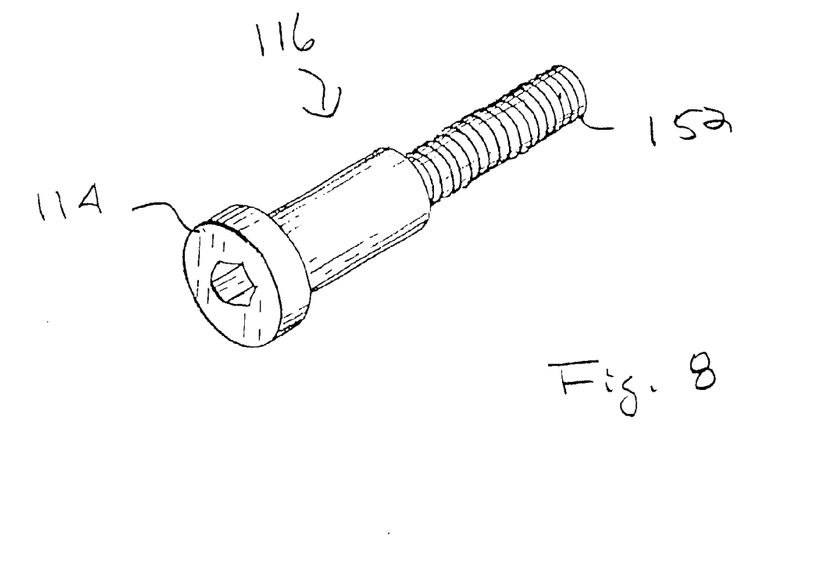
FIG. 8 is a perspective view of a shoulder bolt.
Figure 9:
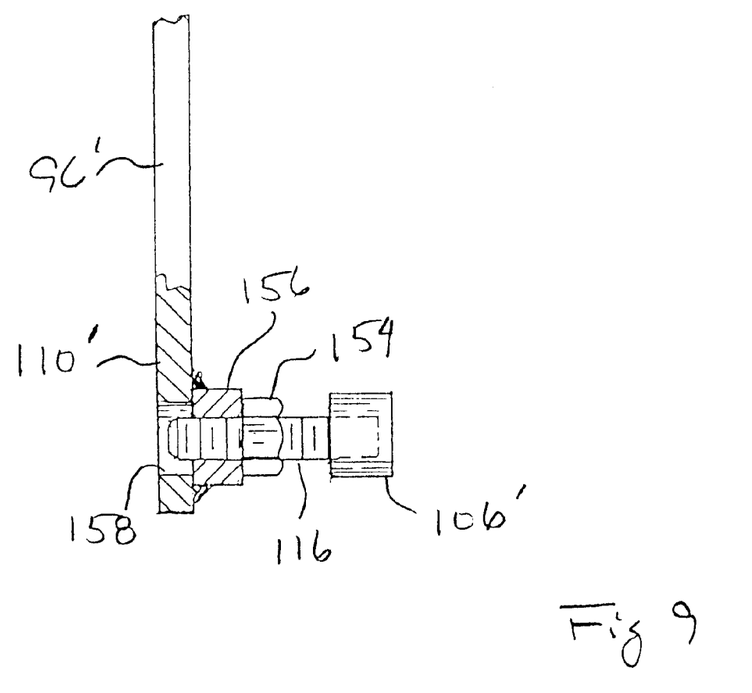
FIG. 9 is front view, partly in cross section, of the second leg of the retainer and a variant of the bumper of FIG. 5.

With reference to FIGS. 5, 7a and 7b, a second embodiment of the assist device 90 is employed in conjunction with a vehicle 10 having a stud 36 as a striker 26. The assist device 90 includes a retainer 92 having an inverted J-shape configuration. The longer, first leg 94 and the shorter, second leg 96 each have a substantially rectangular shape. The width 98 of the retainer 92 is selected such that it may be received between the head 100 of the stud 36 and any washers 102 or adjustment nut (not shown) which may be included with the striker 26, as described further below. Bumpers 104, 106 composed of rubber or similar material are mounted to the distal end portions 108, 110 of each leg 94, 96. Preferably, the bumper 104 on the first leg 94 fully encloses the distal end portion 108. The bumper 106 on the second leg 96 preferably has a conical, truncated cone, cylindrical, or round shape. In a first variant, bumper 106 is mounted to the outside surface 112 of the leg 96 (FIGS. 7a and 7b). In a second variant, bumper 106' is mounted to the head 114 of a shoulder bolt 116 (FIGS. 8 and 9).

The support member 118 has a quasi curvilinear shape and includes a support platform segment 120 and an extension segment 122. Preferably, a non-skid coating or material 124 is affixed to at least a portion of the upper surface 126 of the support platform segment 120. A first end portion 128 of the extension segment 122 is mounted to the crest of the bend portion 130 of the retainer 92, preferably by a weld 132. In a preferred embodiment, the width 134 of the extension segment 122 is substantially equal to the width 98 of the retainer 92 to ensure that the extension segment 122 does not interfere with installation of the assist device 90. The width 136 of the support platform segment 120 however, is greater than the width 134 of the extension segment 122 to provide better support to the user. As shown in FIGS. 5, 7a and 7b, the support platform segment 120 and extension segment 122 may be separate components, with the second end portion 138 of the extension segment 122 being mounted to the first end portion 140 of the support platform segment 120 (preferably by a weld 142). Alternatively, the support member 118 may be of unitary construction.

Preferably, the longitudinal length 144 of the extension segment 122 is selected such that the support platform segment 120 is disposed exteriorly of the door frame 16. As shown in FIG. 5, this allows the centerline 146 of the support platform segment 120 to be co-planar with the centerline 148 of the extension segment 122, minimizing the probability that the application of weight to the support platform segment 120 will result in a moment arm around the centerline 148 of the extension segment. Alternatively, the centerline 146 of the support platform segment 120 may be offset from the centerline 148 of the extension segment 122 to prevent interference between the support platform segment 120 and the door frame 16 if the longitudinal length 144 of the extension segment 122 must be reduced.

The assist device 90 is mounted in place by inserting the retainer 92 between the head 100 of the stud 36 and the side 20 of door frame 16 (and any washers 102 or adjustment nut which may be disposed intermediate the head of the stud and the door frame), as shown in FIG. 7a. The inner surface 150 of the crest of the bend portion 130 of the retainer 92 is configured to engage the stud 36. As the user pushes on the upper surface 126 of the support platform segment 120 to obtain support, the retainer 92 rotates about the stud 36 until the bumper 106 on the second leg 96 engages the side 20 of the door frame 16 to stabilize the support member 118 so that an elderly person or a disabled person may use the support platform segment 120 to assist in entering or exiting the automobile 10.

For the second variant mentioned above, the threaded shaft 152 of the bolt 116 extends through a first nut 154 and is received in a second nut 156 which is mounted coaxially with an opening 158 in the distal end portion 110' of the second leg 96', preferably by a weld. Shaft 152 is adjustably positionable within the threaded opening of the second nut 156 to optimize contact between bumper 106' and a portion of the door frame 16 to selectively position the support platform segment 120 relative to the vehicle 10 and thereby provide improved ease of use. The first nut 154 may be torqued into engagement with the second nut 156 to lock shaft 152 and maintain bumper 106' in such an optimum position.

Figure 10:
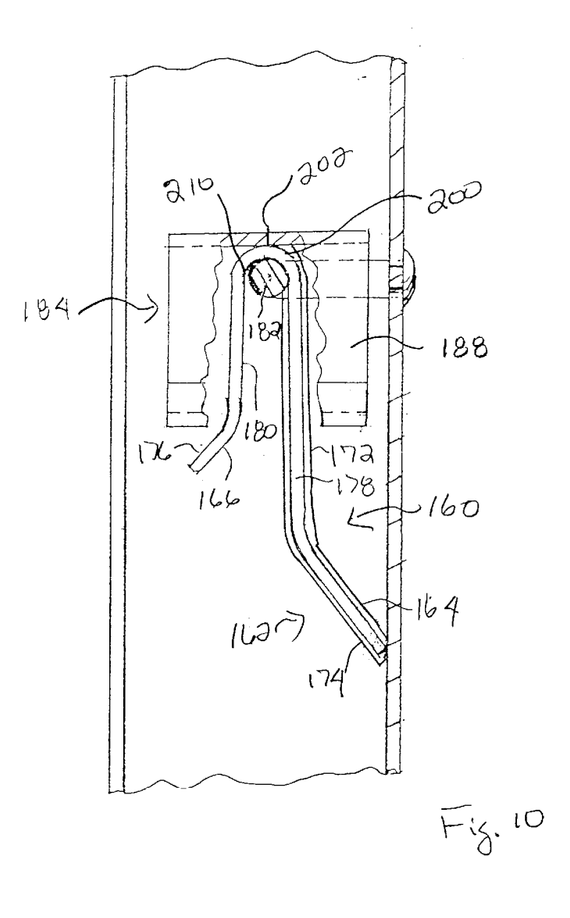
FIG. 10 is a side view, partly in phantom and partly in cross-section, of a third embodiment of an assist device in accordance with the invention mounted on a U-shaped striker member.
Figure 11:
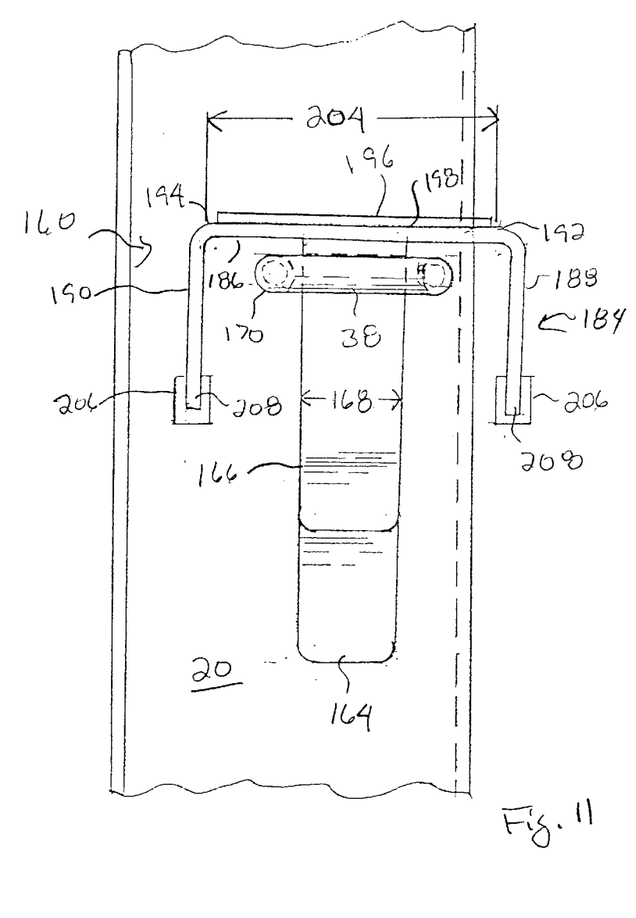
FIG. 11 is a front view of the assist device and U-shaped striker member of FIG. 10.

With reference to FIGS. 10 and 11, a third embodiment of the assist device 160 is employed in conjunction with a vehicle 10 having U-shaped striker members 38. The assist device 160 includes a quasi J-shaped retainer 162 in which the longer, first leg 164 and the shorter, second leg 166 each have a substantially rectangular shape. The width 168 of the retainer 162 is selected such that it may be received between the legs 170 of the U-shaped striker member 38, as described further below. A bumper 172 composed of rubber or similar material is mounted to, and preferably fully encloses, the first leg 164. A lower, distal end portion 174, 176 of each leg 164, 166 extends obliquely outward from the upper, main portion 178, 180 of each leg 164, 166. The distal end portion 176 of the second leg 166 is bent to facilitate insertion of the cross-bar 182 of the U-shaped striker member 38 into the retainer 162 and the distal end portion 174 of the first leg 164 is bent to facilitate engagement with the door frame 16 of the vehicle 10, as described further below.

The support member 184 includes a support platform segment 186 and first and second leg segments 188, 190 which extend orthogonally downward from the first and second ends 192, 194 of the support platform segment 186, respectively. Preferably, a non-skid coating or material 196 is affixed to at least a portion of the upper surface 198 of the support platform segment 186. The crest of the bend portion 200 of the retainer 162 is mounted along the centerline 202 of the support platform segment 186, preferably by a weld, substantially midway between the first and second ends 192, 194. The longitudinal length 204 of the support platform segment 186 is selected such that the two leg segments 188, 190 are disposed exteriorly of the U-shaped striker member 38 at a sufficient distance to ensure that there is no interference between leg segments 188, 190 and legs 170. Preferably, bumpers 206 composed of rubber or similar material wrap around the distal end portions 208 of the leg segments 188, 190.

The assist device 160 is mounted in place by inserting the first leg 164 of the retainer 162 through the opening 86 formed by the U-shaped striker 38 and the side 20 of the door frame 16. The retainer 162 is configured to receive the cross-bar 182 of the U-shaped striker member 38 between the first and second legs 164, 166 such that cross-bar 182 wedges against the interior surface 210 of the crest of the bend portion 200 of the retainer 162 to stabilize the support member 184 so that an elderly person or a disabled person may use the support platform segment 186 to assist in entering or exiting the automobile 10. As the user pushes on the upper surface 198 of the support platform segment 186 to obtain support, the retainer 162 rotates about the cross-bar 182 until the first leg 164 engages the door frame 16 of the vehicle 10 to provide additional support and stability. The oblique angle between the main and distal end portions 178, 174 of the first leg 164 minimizes the distance that the retainer 162 must rotate before the distal end portion 174 engages the door frame 16, thereby maintaining the support platform segment 186 in a substantially horizontal orientation.

Assist devices 40 and 160 are designed to position the support platform segment 46, 186 close to the door frame 16 of the vehicle 10 to prevent deflection of the door frame 16 which could cause an alignment problem between the door latch 28 and the striker 26. All of the assist devices 40, 90, 160 are designed to be used with doorways on either side of a vehicle 10. It should be appreciated that the size of the support platform segment 46, 186 may be increased to facilitate use and to provide greater support to the user. However, the retainer 42, 162 of devices 40 and 160 must be mounted to one side of such an enlarged support platform segment 46, 186, if the support platform segment 46, 186 is to be positioned close to the door frame 16. Consequently, such an assist device will be useable on only one side of a vehicle 10.

It should be appreciated that each of the assist devices 40, 90, 160 described above functions to provide an easily mountable and removable support which attaches to the door frame 16 of a vehicle 10 and provides a stable support platform 46, 120, 186 for allowing a disabled or elderly person to exit from a vehicle 10. It should also be appreciated that if the door 14 is accidently closed while a device 40, 90, 160 is installed, the relatively soft material of the bumpers 78, 104, 106, 206 will prevent or limit damage to the door and door frame, depending on the force of impact. That is bumper 78 on the free end 80 of engagement segment 76 will contact the door and bumper 78 on the first end 56 of support platform segment 56 will contact the door frame for the first device 40; bumper 104 on support platform 120 will contact the door and bumper 106 on the second leg 96 of retainer 92 will contact the door frame for the second device 90; and bumpers 206 on leg segments 188 and 190 will contact the door and door frame, respectively, for the third device 160.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An assist device providing a stable support for entering and exiting a vehicle through a door frame having a striker mounted on a side portion of the door frame, the striker comprising a U-shaped striker member which is engageable with a latch of a door for securing the door in a closed position, the assist device comprising:
   a retainer adapted for insertion through an opening formed between the side portion of the door frame and the striker member and for removably engaging the striker, said retainer having a V-shape and including first and second legs; and
   a support member mounted to the retainer, the support member including a support platform segment adapted for supporting at least a portion of a user's weight wherein the first leg is mounted to the support platform segment of the support member.

2. The assist device of claim 1 wherein the support member has a centerline, the first leg of the retainer being mounted to the support platform segment substantially on the centerline of the support member and the retainer extending longitudinally along said centerline.

3. The assist device of claim 1 wherein the second leg has an end portion having a rounded-shape, the end portion of the second leg and the support platform segment defining a gap therebetween.

4. The assist device of claim 1 wherein the support platform segment has oppositely disposed first and second ends and the support member also includes an extension segment extending laterally downward from the second end of the support platform segment to an engagement segment.

5. The assist device of claim 4 herein the support member further includes a bumper mounted to the first end of the support platform segment and a bumper mounted to the engagement segment.

6. The assist device of claim 4 wherein the support platform segment has an upper surface and the support member further includes a non-skid material affixed to at least a portion of said upper surface.

7. An assist device providing a stable support for entering and exiting a vehicle through a door frame having a striker mounted on a side portion of the door frame, the striker comprising either a U-shaped striker member or a stud member which is engageable with a latch of a door for securing the door in a closed position, the assist device comprising:
   a retainer adapted for removably engaging the striker wherein the retainer includes first and second legs extending from a curved bend portion, the retainer being adapted for receiving and engaging a stud member in the bend portion; and
   a support member mounted to the retainer, the support member including a support platform segment adapted for supporting at least a portion of a user's weight.

8. The assist device of claim 7 wherein each of the legs has a length, the first leg being longer than the second leg.

9. The assist device of claim 7 wherein the first leg has an end portion and the retainer also includes a bumper enclosing the end portion of the first leg.

10. The assist device of claim 7 wherein the second leg has an outer surface and an end portion and the retainer also includes a bumper mounted to the outer surface of the end portion of the second leg.

11. The assist device of claim 7 wherein the support platform segment has an upper surface and the support member further includes a non-skid material affixed to at least a portion of said upper surface.

12. The assist device of claim 7 wherein the support platform segment has oppositely disposed first and second ends and the support member also includes an extension segment extending laterally downward from the second end of the support platform segment to a distal end mounted to the bend portion of the retainer.

13. The assist device of claim 12 wherein the retainer and extension segment each have a width, the width of the extension segment being substantially equal to the width of the retainer.

14. The assist device of claim 13 wherein the support platform segment has a width which is greater than the width of the extension segment.

15. The assist device of claim 7 wherein the second leg has an outer surface and an end portion and the retainer also includes a bumper assembly comprising a bolt and a bumper, the bolt including a shaft threadably engaged with the end portion of the second leg and a head positioned adjacent the outer surface of the second leg, the bumper being mounted on the head of the bolt.

16. The assist device of claim 15 wherein the end portion of the second leg defines an opening and the bumper assembly also comprises first and second nuts, the second nut being mounted to the second leg coaxial with the opening, the shaft of the bolt extending through the first nut, the second nut and the opening and being threadably positionable within the second nut to selectively position the bumper relative to the outer surface of the second leg, the first nut being engageable with the second nut to lock the bumper in position.

17. An assist device providing a stable support for entering and exiting a vehicle through a door frame having a striker mounted on a side portion of the door frame, the striker comprising a U-shaped striker member which is engageable with a latch of a door for securing the door in a closed position, the assist device comprising:
   a retainer adapted for removably engaging the striker wherein the retainer includes first and second legs extending from a curved bend portion, the retainer being adapted for receiving and engaging a cross-bar of the U-shaped striker member; and
   a support member mounted to the retainer, the support member including a support platform segment adapted for supporting at least a portion of a user's weight.

18. The assist device of claim 17 wherein each of the legs has a length, the first leg being longer than the second leg.

19. The assist device of claim 17 wherein the retainer also includes a bumper substantially enclosing the first leg.

20. The assist device of claim 17 wherein each of the legs comprises a main portion extending from the bend portion of the retainer to a distal end portion, the distal end portion of each leg extending obliquely outward from the main portion of each leg.

21. The assist device of claim 17 wherein the support platform segment has an upper surface and the support member further includes a non-skid material affixed to at least a portion of said upper surface.

22. The assist device of claim 17 wherein the support platform segment has oppositely disposed first and second ends and the support member also includes first and second leg segments extending orthogonally downward from the first and second ends of the support platform segment, respectively.

23. The assist device of claim 22 wherein the support member has a centerline and the bend portion of the retainer is mounted along the centerline substantially midway between the first and second ends.

24. The assist device of claim 22 wherein each of the leg segments has a distal end portion and the support member further includes a bumper mounted on the distal end portion of each leg segment.

25. An assist device providing a stable support for entering and exiting a vehicle through a door frame having a U-shaped striker member, mounted on a side portion of the door frame, which is engageable with a latch of a door for securing the door in a closed position, the assist device comprising:

a support member including a centerline, a support platform segment, an extension segment, and an engagement segment, the support platform being adapted for supporting at least a portion of a user's weight and having oppositely disposed first and second ends, the extension segment extending laterally downward from the second end of the support platform segment to the engagement segment; and a retainer adapted for insertion through an opening formed between the side portion of the door frame and a U-shaped striker member, the retainer including first and second legs, the first leg being mounted to the support platform segment intermediate the first and second end substantially on the centerline of the support member, the retainer extending longitudinally along said centerline.

26. An assist device providing a stable support for entering and exiting a vehicle through a door frame having a stud member striker, mounted on a side portion of the door frame, which is engageable with a latch of a door for securing the door in a closed position, the assist device comprising:

a support member including a support platform segment and an extension segment, the support platform segment being adapted for supporting at least a portion of a user's weight and having oppositely disposed first and second ends, the extension segment extending laterally downward from the second end of the support platform segment to a distal end; and a retainer including first and second legs extending from a curved bend portion, the retainer being adapted for receiving and engaging a stud member in the bend portion, the retainer also including a bumper, the bend portion of the retainer being mounted to the distal end of the extension segment of the support member, the second leg having an end portion, the bumper being mounted to the end portion of the second leg.

27. An assist device providing a stable support for entering and exiting a vehicle through a door frame having a U-shaped striker member, mounted on a side portion of the door frame, which is engageable with a latch of a door for securing the door in a closed position, the assist device comprising:

a support member including a centerline, a support platform segment, and first and second leg segments, the support platform being adapted for supporting at least a portion of a user's weight and having oppositely disposed first and second ends, the first and second leg segments extending orthogonally downward from the first and second ends of the support platform segment, respectively; and a retainer including first and second legs extending from a curved bend portion, the retainer being adapted for receiving and engaging a cross-bar of U-shaped striker member in the bend portion, the bend portion of the retainer being mounted along the centerline of the support member substantially midway between the first and second ends of the support platform segment, each of the legs comprising a main portion extending from the bend portion of the retainer to a distal end portion, the distal end portion of each leg extending obliquely outward from the main portion of each leg.

* * * * *